(No Model.) 2 Sheets—Sheet 1.
D. C. WEATHERHEAD.
POTATO SORTER AND SACKER.

No. 574,592. Patented Jan. 5, 1897.

Witnesses.
F. L. Ourand.
R. E. Rabbitt.

Inventor.
D. C. Weatherhead
By John S. Duffie Attorney.

(No Model.) 2 Sheets—Sheet 2.

D. C. WEATHERHEAD.
POTATO SORTER AND SACKER.

No. 574,592. Patented Jan. 5, 1897.

Witnesses.
F. L. Ourand
R. E. Rabbitt

Inventor.
D. C. Weatherhead
By John S. Duffie
Attorney.

UNITED STATES PATENT OFFICE.

DOUGLAS CHARLES WEATHERHEAD, OF SABIN, MINNESOTA, ASSIGNOR OF ONE-THIRD TO JOSIAH BENJAMIN FLANDERS.

POTATO SORTER AND SACKER.

SPECIFICATION forming part of Letters Patent No. 574,592, dated January 5, 1897.

Application filed June 6, 1896. Serial No. 594,513. (No model.)

*To all whom it may concern:*

Be it known that I, DOUGLAS CHARLES WEATHERHEAD, a citizen of the United States, residing at Sabin, in the county of Clay and State of Minnesota, have invented certain new and useful Improvements in Potato Sorters and Sackers; and I do hereby declare the following to be a full, clear, and exact description of the invention, such as will enable others skilled in the art to which it appertains to make and use the same.

My invention is intended for a potato sorter and sacker, but may be used as well for apples, pears, and the like.

It consists of a frame, inclined screens, and means for holding the sack.

Figure 1:
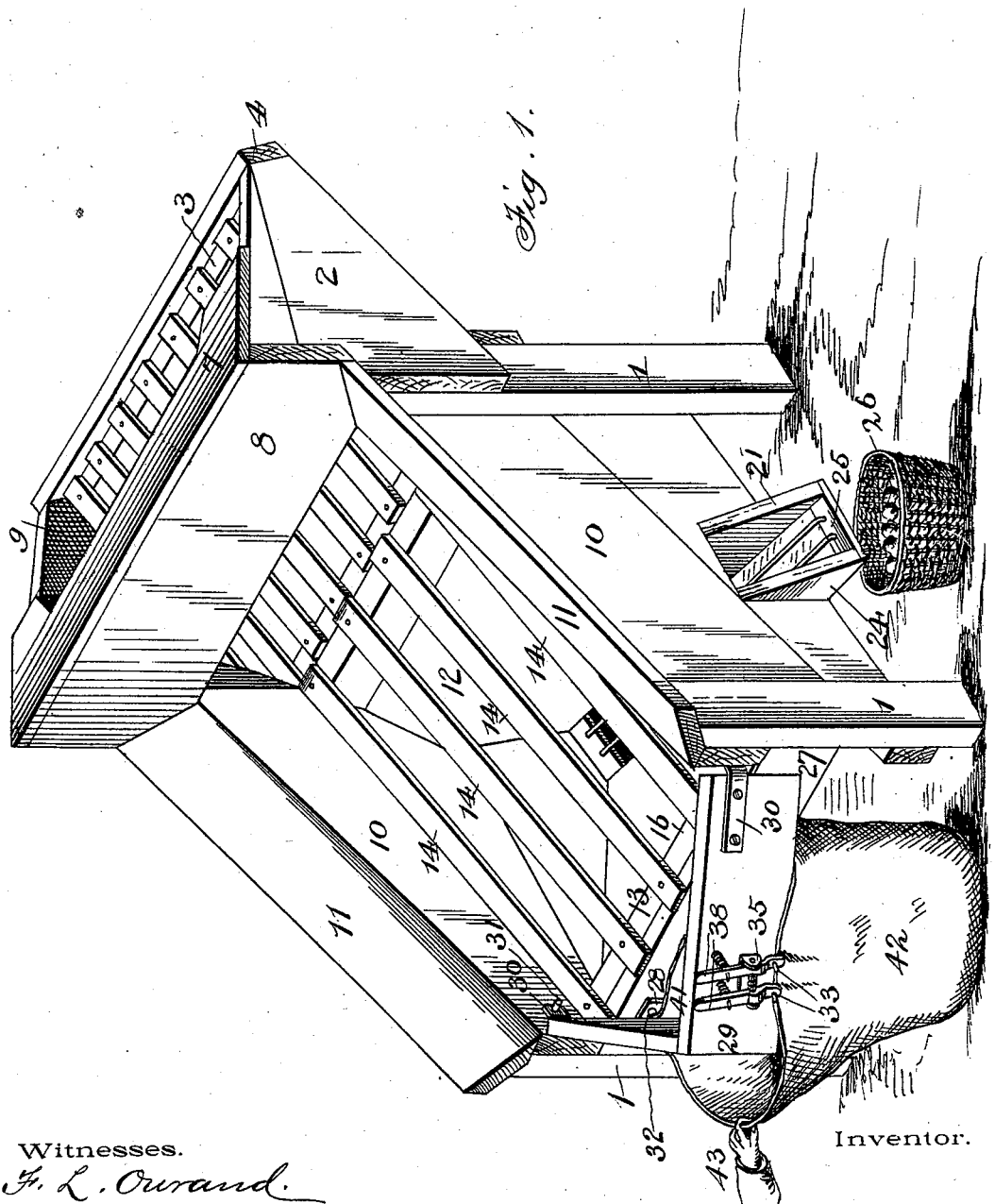
Figure 2:
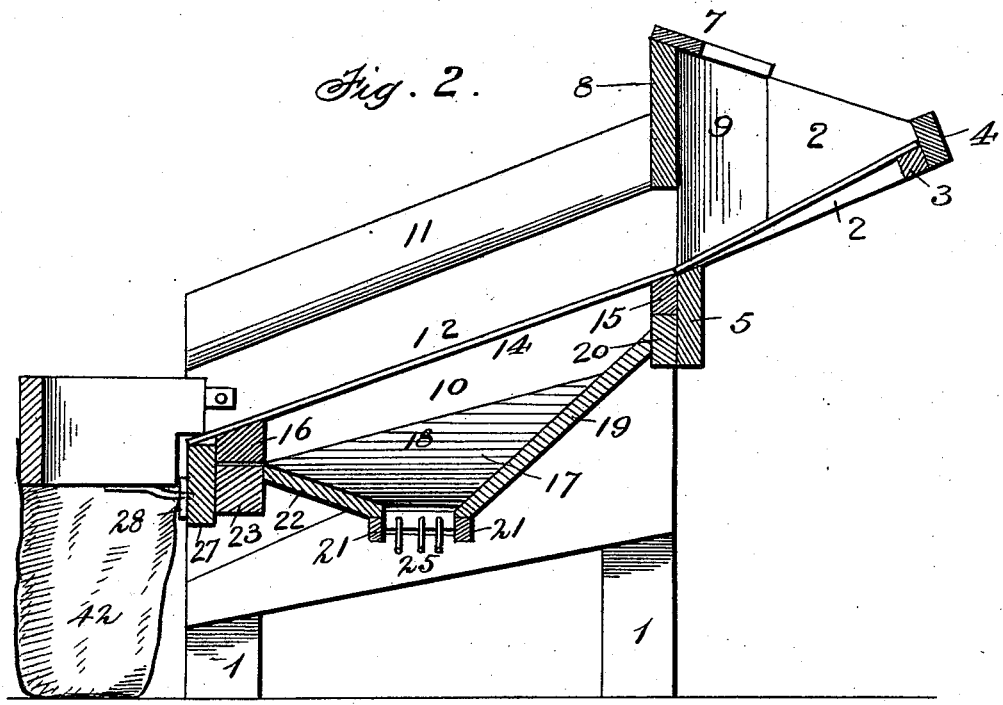
Figures 3, 4, 5:
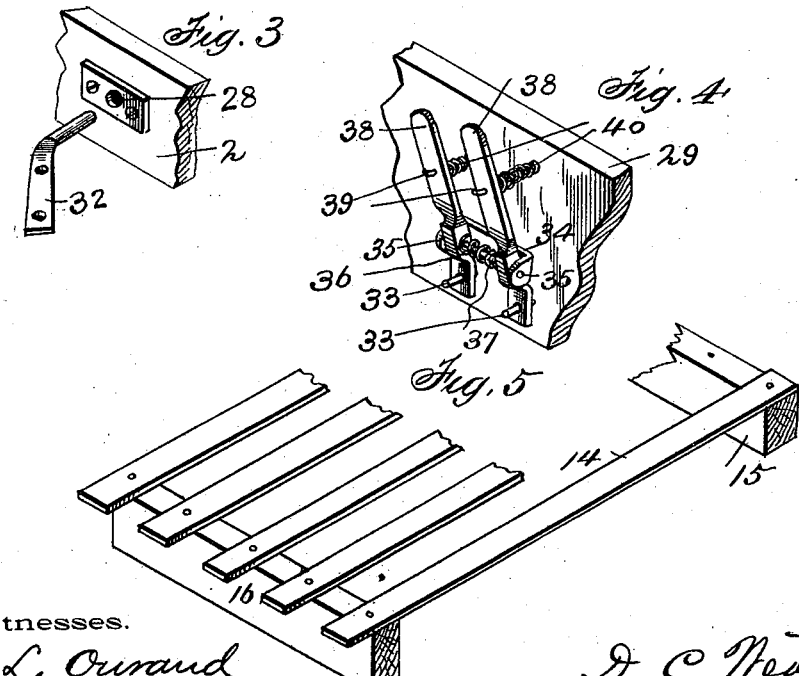

In the accompanying drawings, Figure 1 is a perspective view of my invention. Fig. 2 is a longitudinal sectional elevation. Figs. 3, 4, and 5 are detail views.

My invention is described as follows:

1 are the standards, to which is secured a hopper 2. Said hopper is provided with an inclined screen 3, which extends from the front beam 4 of the hopper to the cross-beam 5 of the frame. This inclined screen is removable, so that the bars thereof may be arranged closer or wider in each case. The front part of the hopper is provided with an inclined plate 7, front wall 8, and V-shaped corner-pieces 9. In the process of separating the potatoes they are thrown up into this hopper, and any potatoes that fall upon the inclined plate 7 are rolled down in the hopper onto the screen 3. The V-shaped corner-pieces 9 are to keep the potatoes from getting into the corners and to facilitate their downward movement.

The side walls 10 of the separator are secured to the inner faces of the standards 1, and the upper edges of each are covered by inclined plates 11, so as to direct the potatoes into the screen 12. This screen consists of cross-pieces 13 and bars 14. The upper end of this screen 12 rests on the cross-beam 15 and its lower end on the cross-beam 16, and the smaller potatoes fall through onto the treble-inclined chute 17, consisting of the inclined plate 18, one edge of which rests against the inner face of the wall 10 and the other converging nearly to a point. Another incline 19 has its upper end secured to the cross-beam 21. Another incline 22 has its upper end secured to the cross-beam 23 and its lower end to the cross-beam 24, and at the point where these three inclines come nearly together is left an opening, and said opening is provided with an inclined screen 25. The smaller potatoes fall upon this inclined screen and roll into a basket 26, while the dirt passes through the screen and falls upon the ground.

To the lower end of the frame is secured the sack-holder, which consists of the cross-beam 27, perforated plates 28, secured to the outer face of the cross-beam, a V-shaped frame 29, hinged to the inner faces of the walls 10 by means of perforated plates 30, secured to the free ends of said frame, and pins 31, secured in walls 10, passing through the perforations in said plates.

To the lower edge of the frame 29 are secured pins 32, adapted to enter the perforations in the plates 28 when the frame is dropped down.

To the outer face of the frame 29 are secured two pins 33, and immediately on said pins is secured a plate 34, having perforated flanges 35, these flanges acting as bearings in which a pin 36 works, and around this pin is a spiral spring 37, and on the pin 36 and at each end of the spiral spring 37 are pivoted two metal bars 38, provided at their lower ends with perforations that fit over the pins 33.

Secured to the outer face of the frame 29 are two pins 39, their outer ends extending through perforations in the bars 38 and being bent down to keep said bars from coming off of said pins. Between the outer face of the frame 29 and the inner faces of the bars 38 and around the pins 39 are coil-springs 40. These springs keep the lower ends tight down against the outer face of the frame 29 and over the pins 33.

The cross-beam 27, perforated plates 28, frame 29, hinged to the side walls 10, the pins 32, the perforated metal bars 38, secured to the frame 29, and pins 33 constitute my sack-holder. To put the sack in place, the said frame 29 is thrown up, and the upper edge 41 of the sack 42 is put over the pins 32. The frame is then let down in place and the pins 32 enter the perforations of the plates 28 and one side of the sack is secured to the crossbeam 27, (the lower end of the frame.) The other side of the sack is brought forward and hooked over the pins 33. The lower ends of the metal bars 38 are then allowed to fall down over said pins and the other side of the sack is secured. A part of the sack, however, is left slack, so that a man with his hand 43 can hold the same out and pick out any imperfect potatoes that may fall into the sack, or the sack may be gathered under the holders and the attendant may sort the potatoes by reaching over the top of the sack-holder.

As the potatoes, fruits, &c., do not always grow to be the same size each year, it is desirable to have different screens, and screens with different-sized openings may be used.

Having described my invention, what I claim as new, and desire to secure by Letters Patent, is—

In a separator, substantially as shown and described, the sack-holder, consisting of the cross-beam 27, perforated plates 28, V-shaped frame 29, hinged to the lower end of said separator; pins 32, secured to the lower edge of said frame and adapted to enter the perforations in the plates 28; pins 33, in the outer face of the frame 29; perforated metal bars 38, pivoted in bearings 35, the lower perforations of said bars adapted to fit over the pins 33, and to be held in place by springs 40, substantially as shown and described and for the purposes set forth.

In testimony whereof I affix my signature in presence of two witnesses.

DOUGLAS CHARLES WEATHERHEAD.

Witnesses:
A. H. HOLLOWAY,
A. T. HOLLOWAY.